Dec. 29, 1925.  
J. BURT  
LATHE  
Filed May 13, 1924

WITNESS:  
INVENTOR  
John Burt  
BY  
ATTORNEYS.

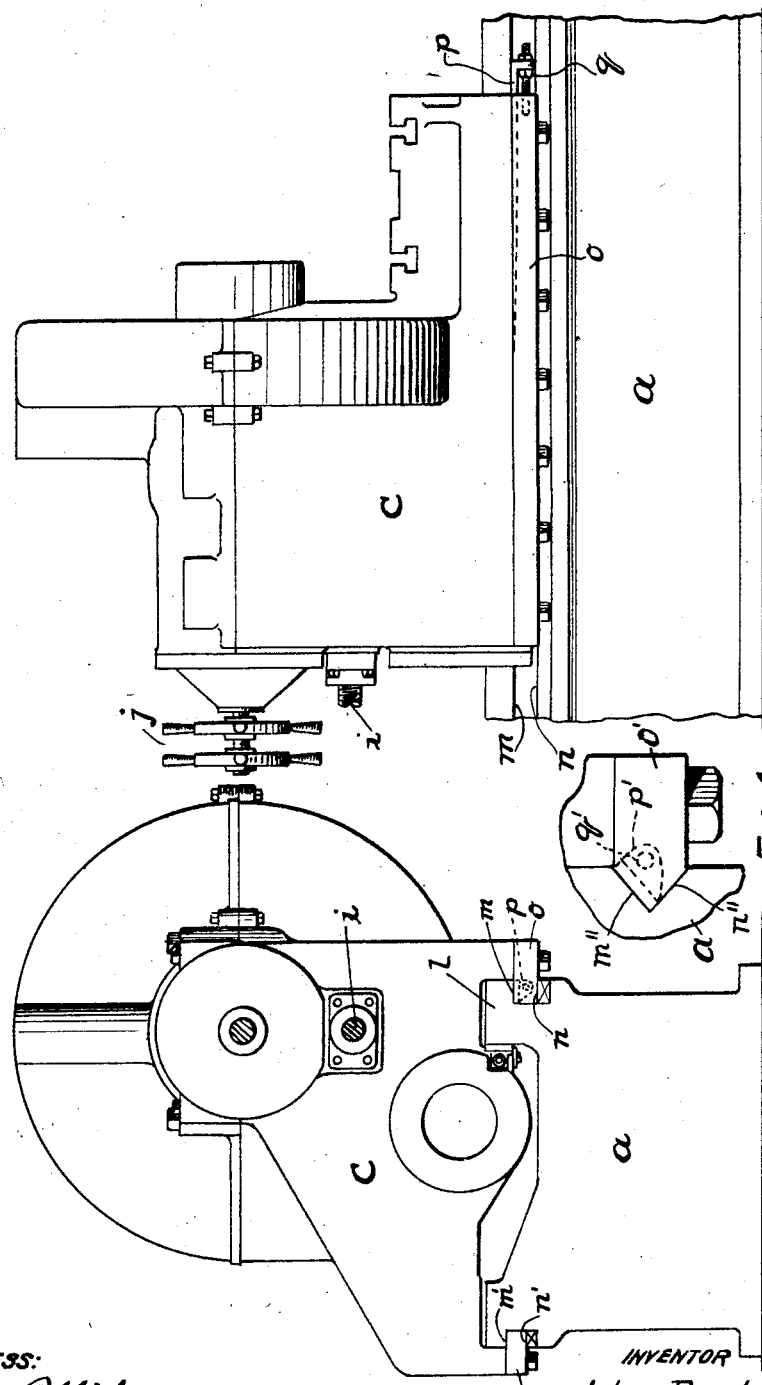

Patented Dec. 29, 1925.

1,567,705

UNITED STATES PATENT OFFICE.

JOHN BURT, OF NARBERTH, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

LATHE.

Application filed May 13, 1924. Serial No. 712,924.

*To all whom it may concern:*

Be it known that I, JOHN BURT, a citizen of the United States, residing at Narberth, county of Montgomery, and State of Pennsylvania, have invented a new and useful Improvement in Lathes, of which the following is a full, clear, and exact description, reference being had to the accompanying drawings, which form a part of this specification.

My invention relates to an improvement in lathes and more particularly to that type of lathe used for machining car wheels.

In the ordinary type of large lathe, for example, an engine lathe, it is customary to provide on the bed, flat top shears or sliding surfaces upon which the saddle or tool holder slides when the tool is in operation, and upon which the sliding or poppet head is adjusted in setting up the work. The side surfaces of the shears serve as guides to keep the slides and heads in longitudinal alignment. In such a lathe the wide top shears provide large wearing surfaces for the tool holder to slide on under the cutting pressure of the tools. The poppet head is moved into position and clamped before the final centering pressure is applied through the spindle.

In a car wheel lathe, similar wide top surfaces or shears are provided but are not used as sliding surfaces for the tool carriage. The tool carriages travel on guides which are carried by tool posts which do not slide on the bed but which are carried on an extension of the head itself. In no case does the tool slide move under pressure on the ways of the bed. In such a lathe, the wide top surfaces have been and are used as sliding surfaces for the adjustable head. In all cases the side surfaces of the ways are used for aligning the spindles and the tool slides.

The material which is machined in a car wheel lathe; namely, the hammered and worn treads of the car wheels, is usually a very hard grade of steel, and the machining is accompanied by the production of a very hard fine grit in addition to the regular chips. Some of this grit settles on the exposed portion of the shears and is hard enough to imbed itself in the metal of the shears and metal of the head, and acts as an abrasive to cut the bearing between the head and the shears. This cutting is made more serious by the conditions under which the adjustable head is set up into position. In a car wheel lathe, the sliding head is moved by power and the power is further utilized for driving home the centering devices and in many cases for embedding the teeth of the driving bits into the sides of the wheels. This action causes a heavy pressure to be exerted at the center of the head, and so produces an overturning couple. This couple tends to raise the forward end of the sliding head, the scraping action of the front edge of the head is lost, and the fine dust or grit from the cuttings, and which settles on the shears at or near the forward position of the sliding head, is trapped by and drawn under the head. The conditions explained above result in excessive wear on that portion of the shears and the bed which are within reach of the grit from the cuttings.

In the customary form of lathe, when the wear becomes excessive, it is necessary to renew the top surface of the shears and in some cases, the sliding surface of the head. It is a difficult and expensive operation to renew these surfaces, and in order to make it easier, the top surfaces of the shears on car wheel lathes have in some instances, been made with renewable plates which become, in effect, the top surface of the shears.

When the power used for adjusting the head is shut off and the lathe is working, there is a tendency for the head to move backwards and release the pressure on the drivers and on the centering device. In order to compensate for this, mechanisms are usually provided for clamping the head, when in its forward position, to the bed.

It is the object of my invention to provide a lathe in which the sliding bearing for the adjustable head will be removed from the exposed top of the shear and placed in a protected position under the projecting edges of the top of the bed. It is also my object to make this sliding bearing in the form of a separate and renewable piece bolted to the side of the bed. It is further the object to provide the guide for the sliding head with a tapered shoe adjustment which may be used from time to time to take up any lost motion and thereby maintain alignment. Another object of my invention is to change the clamp from a manual or power operated one, positioned on the guiding surface of the head, to a more efficient part of the mechanism and to make it automatic, so that the action of the operator in shutting off his adjusting motor will at the same time cause the clamping means to become effective.

Having now indicated, in a general way, the nature, purpose and advantage of my invention, I will proceed to a more detailed description of a preferred embodiment thereof, with reference to the accompanying drawings, in which—

Fig. 2 is a side elevation of a portion of the lathe shown in Fig. 1.

Fig. 3 is an end view of the sliding head from the right hand end, Fig. 1.

Fig. 4 is a detail view of a modification in construction.

Figure 1:
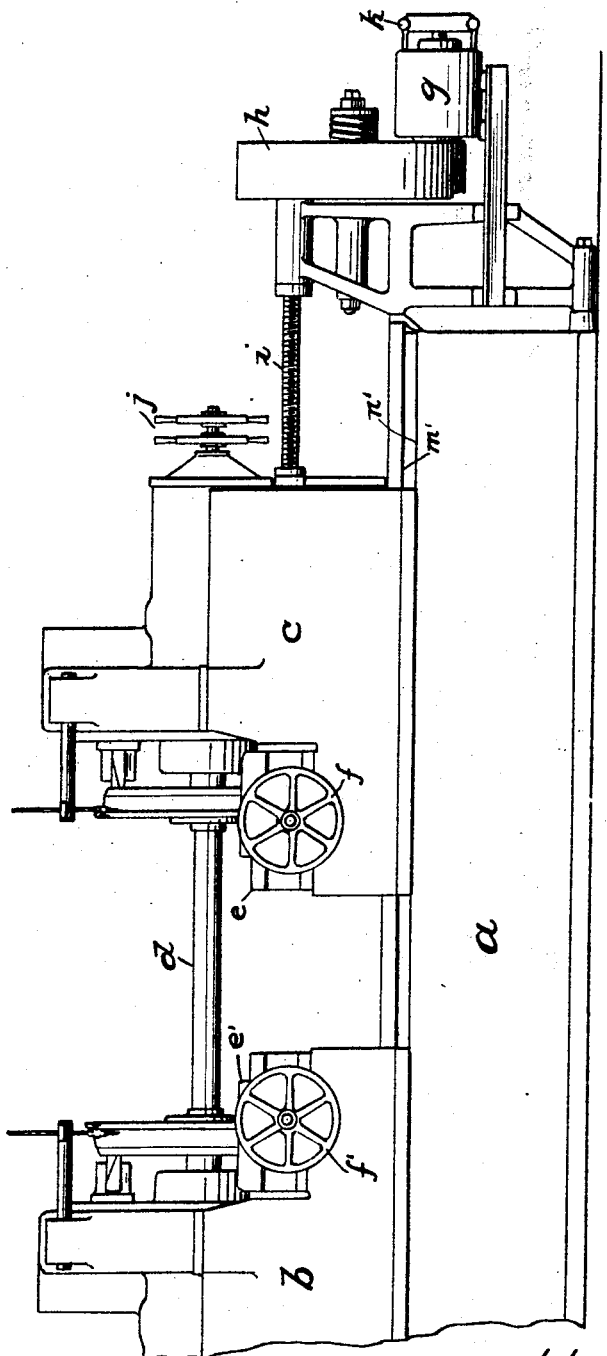
Fig. 1 is a partial side elevation of a car wheel lathe embodying my invention.

The lathe as shown comprises a bed $a$ provided with a head $b$ and a slidable head $c$, between which are adapted to be supported a pair of wheels $d$ adapted to be engaged by driving bits of any customary form. The heads $c$ and $b$ are respectively provided with any customary form of tool holding devices $e$ $e'$ adapted to be adjusted by hand wheels $f$ $f'$. The head $c$ is adapted to be moved on the bed $a$ by means of the electric motor $g$ through clutch $h$ and screw $i$, hand wheels $j$ being provided for manual adjustment of the spindle in the head. The clutch $h$ is of such a character and is adjusted so that when the desired end pressure has been applied to the head $c$, that is to properly set the driving bits, the clutch will transmit no further power, or, in other words, will slip. The motor $g$ is provided with a solenoid brake $k$ connected with the motor circuit, so that when the current is turned on the motor for adjustment of the head, the solenoid will be energized and the brake released; while when the current is shut off the motor, the head having been adjusted into desired position, the solenoid will be de-energized and the brake will operate to prevent any rotation of the motor, or backing of the head, and will, in effect, clamp the head in position.

On the top of the bed $a$ and extending longitudinally thereof is positioned a guide $l$ provided with surfaces on its opposite sides which provide longitudinal aligning bearings for the head $c$. The head $c$ is so arranged as to be clear of the top surface of the guide $l$, in contradistinction to previous practice wherein the head had a bearing on the top surface.

The bed $a$ is undercut, or channeled, longitudinally, below the top at its rear and front, the undercuts or channels being provided respectively with upper bearing surfaces $m$ $m'$ and lower bearing surfaces $n$ $n'$. Shoes $o$ $o'$ are secured beneath the head and have a sliding fit between the bearing surfaces in the undercuts.

The bearing surface $m$, since it is closest to the center line of the machine, is the most important bearing and is made adjustable by the provision of a tapered shoe and a tapered key or bearing surface $p$ adjustable by means of a bolt $q$, for the purpose of compensating for wear, as shown in Fig. 2. Any of the bearing surfaces $n$ $n'$ and $m'$ may be made renewable or adjustable for wear, but such is not ordinarily necessary since the greatest strain falls on bearing surface $m$, which, as above described, is adjustable.

Referring to the modification shown in Fig. 4, one or both of the undercuts or channels in the bed $a$ may be made V-shaped providing the bearing surfaces $m''$, $n''$ in which a shoe $o''$, secured to head $c$, has a sliding fit. The bearing surface $m''$ may be made adjustable by the provision of a tapered shoe and tapered key $p'$ adjustable by means of a bolt $q'$. In the modification shown in Fig. 4, the forces acting on the surfaces $m''$, $n''$ will result in a force acting transversely of the bed, which will be met by a similar force if the undercut or channel in which are the surfaces $m'$, $n'$ is V-shaped, or by the side of shoe $o'$ bearing against the bed if the channel in which are the surfaces $m'$, $n'$ be as shown in Fig. 3.

It will now be observed that the principal bearing surfaces, that is, those upon the head slides and those taking the strain of the couple set up when the head is adjusted, are below the head and protected from dust and chips and thus protected from wear.

Further, by the provision of the bearing surfaces for the head, as above described, and provision of the solenoid brake on the motor, the necessity for clamping mechanism is eliminated and the overturning couple produced by the pressure necessary to imbed the driving bits into the sides of the car wheels is effectively resisted and the front end of the head is effectively prevented from lifting.

It will be noted that my invention is not limited to the specific details of the embodiment illustrated, as it will be obvious that various changes in detail may be made without departing from the spirit of my invention.

Having now fully described my invention, what I claim and desire to protect by Letters Patent is:

1. A car wheel lathe having a bed, a head arranged to be moved longitudinally of the bed relative to the car wheels to be turned, and a longitudinally extending guide and groove connection between the head and bed, below the top of the bed and protected thereby, the guide and groove being so arranged that the top of the guide at one end is forced into engagement with the upper face of the groove while the bottom of the guide at the other end is forced into engagement with the lower face by the movement of the head into engagement with a car wheel which tends to overturn the head.

2. A car wheel lathe having a bed, a head arranged to be moved longitudinally of the bed relative to the car wheels to be turned, a longitudinally extending guide and groove connection between the head and bed below the top of the bed and protected thereby, the guide and groove being so arranged that the top of the guide at one end is forced into engagement with the upper face of the groove while the bottom of the guide at the other end is forced into engagement with the lower face by the movement of the head into engagement with a car wheel which tends to overturn the head, and a transversely adjustable tool holder mounted on the head.

3. In a car wheel lathe, in combination, a bed having a longitudinally extending channel therein below the top thereof, two of the walls of which form vertically opposite bearing surfaces, a head movable longitudinally of the bed and subjected to a turning movement about an axis normal to the length of the bearing surfaces when under pressure, a shoe carried by said head and extending within said channel, opposite surfaces of said shoe being adapted to bear on the bearing surfaces formed in said channel.

4. In a car wheel lathe, in combination, a bed, a head slidable thereon, a lateral guide for the head positioned on the top of the bed, vertically opposed and longitudinally extending bearing surfaces formed in the bed below the top thereof, and a shoe carried by the head and adapted to bear on one of said opposite bearing surfaces at one end and on the other surface at the other end when the head is subjected to a turning movement about an axis normal to the length of the bearing surfaces when under pressure.

5. In a car wheel lathe, in combination, a bed having a longitudinally extending channel formed in the side thereof, the upper and lower walls of which form vertically opposite bearing surfaces, a shear providing opposite lateral guiding surfaces positioned on the top of the bed, a head, means carried by the head adapted to bear on the lateral guiding surfaces of said shear and retain the head in alignment, and a laterally extending shoe carried by said head and adapted to extend within said channel and bear on the upper and lower bearing surfaces formed therein to support the head against vertical movement.

6. In a car wheel lathe, in combination, a bed having longitudinally extending opposed bearing surfaces formed in the side thereof, a head, means adapted to bear on one of said opposite bearing surfaces carried by said head, and means cooperating with and adjustable relative to said first mentioned means adapted to bear on the other of said opposite bearing surfaces.

7. In a car wheel lathe, in combination, a bed having a longitudinally extending channel formed in the side thereof, opposite bearing surfaces formed in said channel, a head, a shoe provided with a surface adapted to bear on one of said opposite bearing surfaces, the opposite surfaces of said shoe being tapered, carried by said head and extending laterally thereof within said channel, and a key, one surface of which is adapted to bear on the other of said opposite surfaces and the other surface of which is tapered, adapted to cooperate with said shoe to provide a bearing between said shoe and said bearing surface, and means to adjust said key relative to said shoe to compensate for wear.

8. In a car wheel lathe, in combination, a bed provided with bearing surfaces, a head adapted to slide on the bed, means for moving the head longitudinally on said bed, and a brake adapted to lock said means for moving the head.

9. In a car wheel lathe, in combination, a bed provided with bearing surfaces, a head adapted to slide on the bed, means for moving the head longitudinally on the bed, and means adapted to act on said means and prevent longitudinal movement of the head.

10. In a car wheel lathe, in combination, a bed provided with bearing surfaces, a head adapted to slide on the bed, a motor, mechanism actuatable by the motor for moving the head longitudinally on the bed and a brake adapted to be actuated to lock said mechanism when the motor is stopped and thereby clamp the head to the bed.

11. In a car wheel lathe, in combination, a bed having vertically opposite bearing surfaces formed beneath its top, a shear providing opposite laterally bearing surfaces positioned on the top of the bed, a head, means carried by the head adapted to bear against said lateral and vertically opposite bearing surfaces, an electric motor, means actuatable by the motor to move the head longitudinally relative to the bed, a brake adapted to be actuated to prevent actuation of said means when current is cut off from said motor and to be released when current is put on the motor, and a solenoid in the motor circuit for controlling said brake.

12. In a car wheel lathe, in combination, a bed having vertically opposite bearing surfaces formed beneath its top, a shear providing opposite laterally bearing surfaces positioned on the top of the bed, a head, means carried by the head adapted to bear against said lateral and vertically opposite bearing surfaces, an electric motor, means actuatable for moving the head longitudinally of the bed, a friction clutch affording a connection between the motor and said means, said clutch being adjustable to slip under a predetermined maximum load, a brake adapted to prevent rotation of said motor, and a solenoid in the motor circuit adapted to control the application and release of said brake when current is taken off and put on said motor respectively.

In testimony of which invention, I have hereunto set my hand, at Philadelphia, Pa., on this 7th day of May, 1924.

JOHN BURT.